(12) United States Patent
Kim et al.

(10) Patent No.: US 9,073,429 B2
(45) Date of Patent: Jul. 7, 2015

(54) METHOD FOR CONTROLLING ACCELERATION PEDAL OF VEHICLE

(75) Inventors: Eunsik Kim, Daegu (KR); Yangrae Cho, Hwaseong-si (KR); Jongsang Noh, Ulsan (KR)

(73) Assignees: HYUNDAI MOTOR COMPANY, Seoul (KR); KIA MOTORS CORPORATION, Seoul (KR); DONGHEE INDUSTRIAL CO., LTD., Ulsan (KR)

(*) Notice: Subject to any disclaimer, the term of this patent is extended or adjusted under 35 U.S.C. 154(b) by 766 days.

(21) Appl. No.: 13/225,083

(22) Filed: Sep. 2, 2011

(65) Prior Publication Data
US 2012/0143439 A1 Jun. 7, 2012

(30) Foreign Application Priority Data
Dec. 6, 2010 (KR) ........................ 10-2010-0123776

(51) Int. Cl.
| | |
|---|---|
| G06F 7/00 | (2006.01) |
| B60T 7/12 | (2006.01) |
| B60Q 1/00 | (2006.01) |
| G08G 1/16 | (2006.01) |
| F16H 61/662 | (2006.01) |
| F16H 59/48 | (2006.01) |
| B60K 26/02 | (2006.01) |
| B60W 50/16 | (2012.01) |

(52) U.S. Cl.
CPC .............. *B60K 26/021* (2013.01); *B60W 50/16* (2013.01); *Y02T 10/52* (2013.01)

(58) Field of Classification Search
USPC ................... 701/36, 51–55, 94–96, 300–302; 477/46, 47, 98, 111, 121; 340/435–439, 903; 180/271
See application file for complete search history.

(56) References Cited

U.S. PATENT DOCUMENTS

| | | | | |
|---|---|---|---|---|
| 6,574,541 | B2 * | 6/2003 | Katakura et al. ................. | 701/54 |
| 7,570,156 | B2 * | 8/2009 | Cicilloni et al. .............. | 340/435 |
| 7,822,526 | B2 * | 10/2010 | Sugano et al. ................... | 701/96 |
| 7,904,246 | B2 * | 3/2011 | Kondoh et al. ............... | 701/301 |
| 7,966,119 | B2 * | 6/2011 | Sugano et al. .................. | 701/96 |
| 8,060,289 | B2 * | 11/2011 | Takae et al. ..................... | 701/96 |
| 2003/0236624 | A1 * | 12/2003 | Kimura et al. ................ | 701/301 |
| 2004/0140143 | A1 * | 7/2004 | Saeki et al. ................... | 180/271 |
| 2006/0250224 | A1 * | 11/2006 | Steffel et al. .................. | 340/435 |

(Continued)

FOREIGN PATENT DOCUMENTS

| | | |
|---|---|---|
| JP | 2007-182196 A | 7/2007 |
| JP | 2008-077189 A | 4/2008 |

(Continued)

*Primary Examiner* — James Trammell
*Assistant Examiner* — Majdi Alsomiri
(74) *Attorney, Agent, or Firm* — Morgan, Lewis & Bockius LLP

(57) ABSTRACT

A method controls an acceleration pedal of a vehicle that calls a driver's attention by causing vibration or increasing pedal effort in the acceleration pedal according to diversified driving situations. The method includes selecting a control mode of selecting, by a driver, a control mode given to the acceleration pedal, judging an eco red state of judging whether the vehicle is driven for a predetermined time in the eco red state, and executing the control mode of giving the control mode selected at the selecting of the control mode to the acceleration pedal when it is judged that the vehicle is driven for the predetermined time in the eco red state at the judging of the eco red state.

16 Claims, 9 Drawing Sheets

(56) References Cited

U.S. PATENT DOCUMENTS

| | | | |
|---|---|---|---|
| 2008/0174415 A1* | 7/2008 | Tanida et al. | 340/438 |
| 2009/0164082 A1* | 6/2009 | Kobayashi et al. | 701/94 |
| 2009/0259372 A1* | 10/2009 | Hijikata et al. | 701/49 |

FOREIGN PATENT DOCUMENTS

| | | |
|---|---|---|
| JP | 2008-221909 A | 9/2008 |
| JP | 2009096245 A | 5/2009 |
| JP | 2009255648 A | 11/2009 |
| JP | 2010-023769 A | 2/2010 |
| KR | 1020070092654 A | 9/2007 |
| KR | 10-2008-0051222 A | 6/2008 |
| KR | 1020080055143 A | 6/2008 |
| KR | 1020080055144 A | 6/2008 |

\* cited by examiner

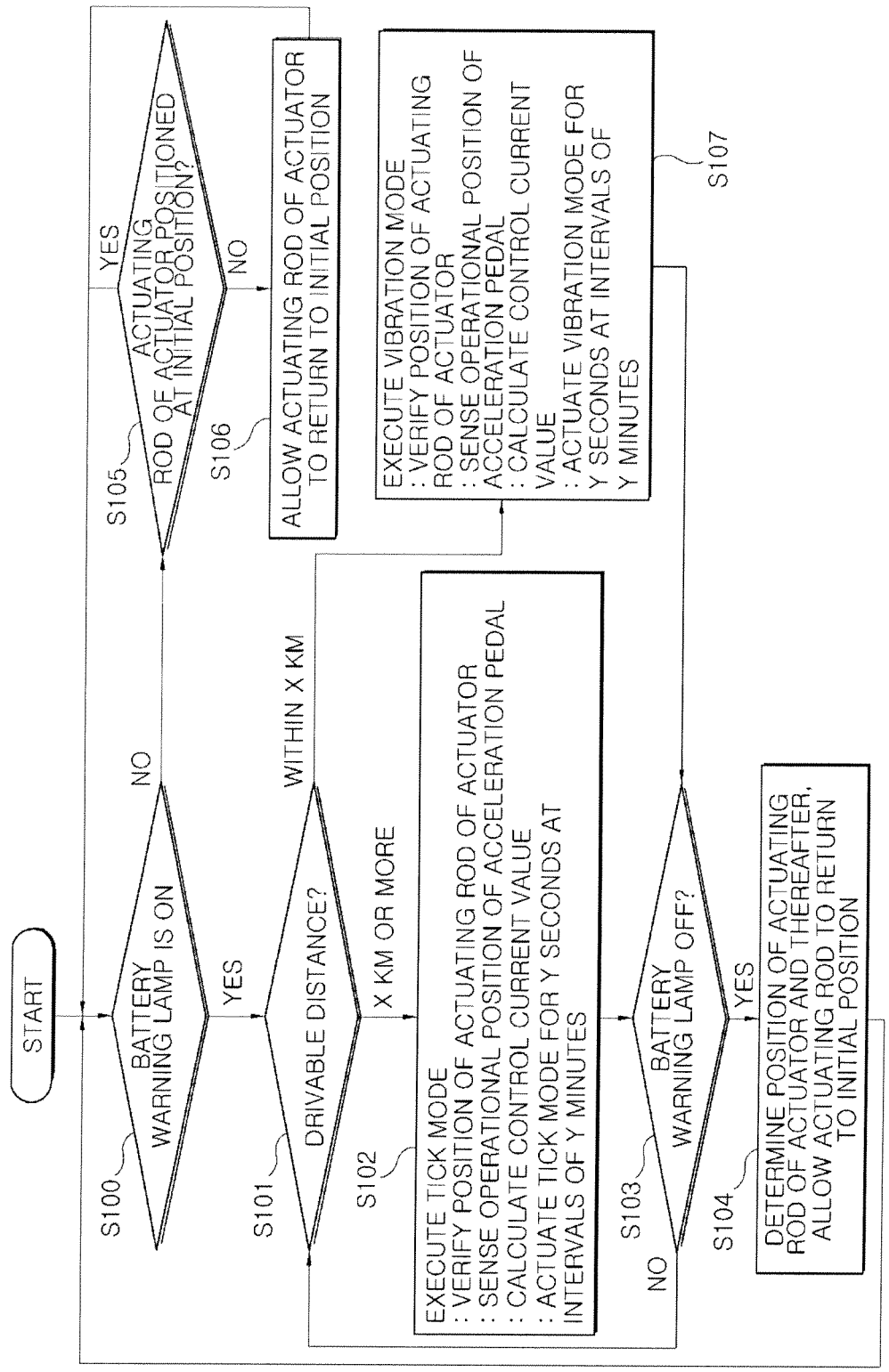

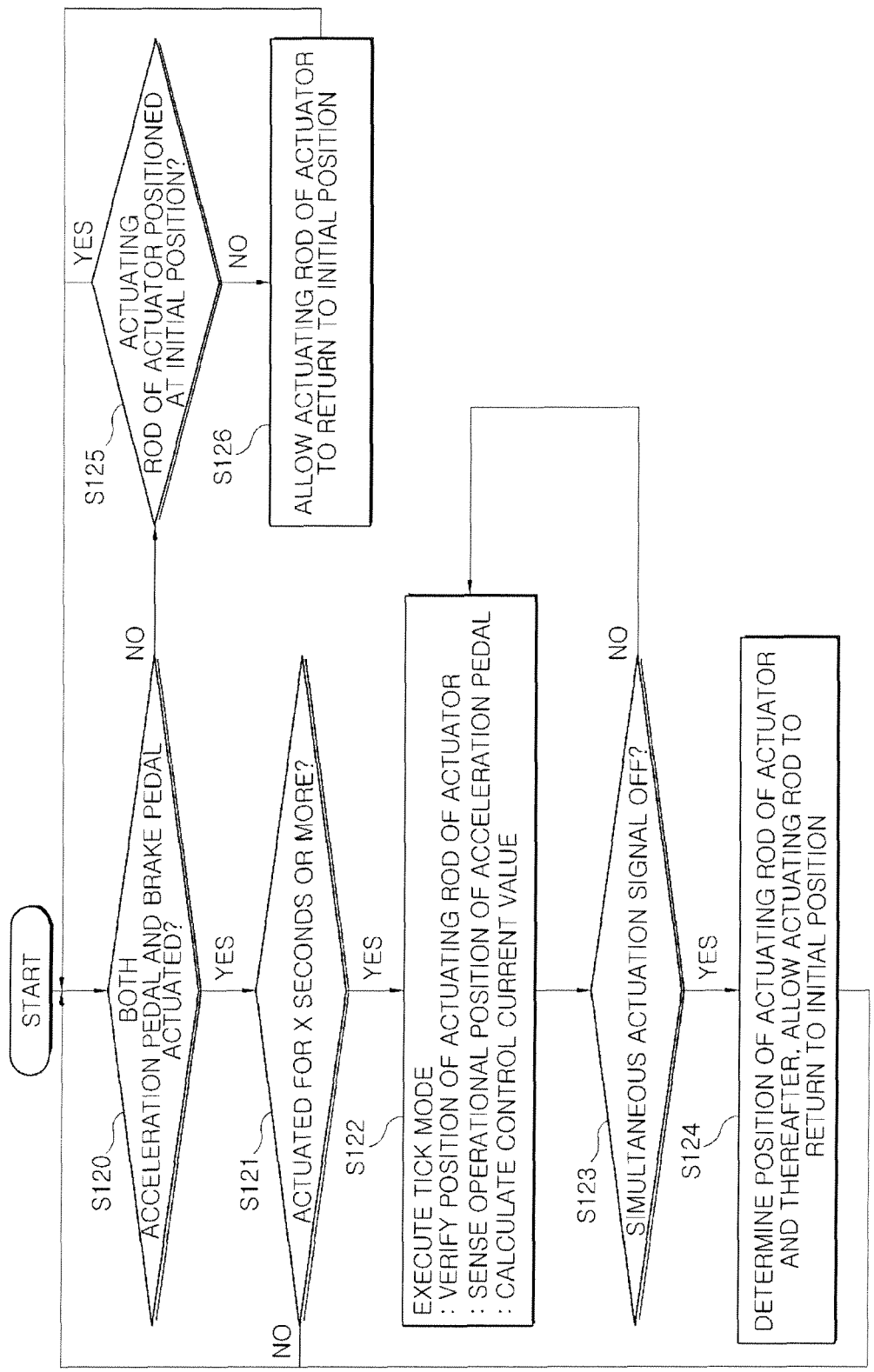

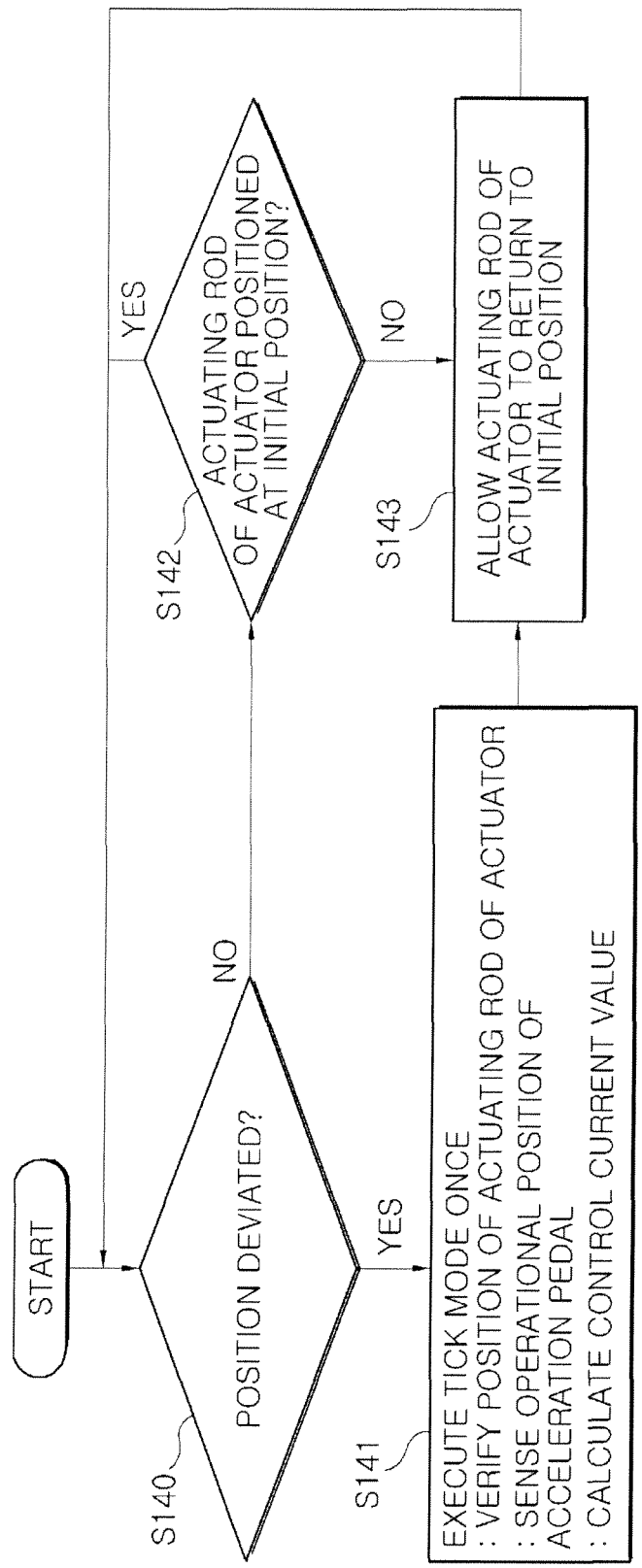

METHOD FOR CONTROLLING ACCELERATION PEDAL OF VEHICLE

CROSS-REFERENCE TO RELATED APPLICATIONS

The present application claims priority to Korean Patent Application No. 10-2010-0123776 filed Dec. 6, 2010, the entire contents of which application is incorporated herein for all purposes by this reference.

BACKGROUND OF INVENTION

1. Field of Invention

The present invention relates to an acceleration pedal of a vehicle, and more particularly, to a method for controlling an acceleration pedal of a vehicle that warns a driver by causing vibration in the acceleration pedal or increasing pedal effort according to diversified driving situations.

2. Description of Related Art

In a vehicle in the related art, an acceleration pedal which a driver operates with his/her foot to accelerate the vehicle is rotatably installed in a vehicle body.

A function to warn the driver by increasing the pedal effort or causing the vibration in the acceleration pedal according to the driving situation of the vehicle has been required.

An acceleration pedal device warns the driver with respect to the driving situation of the vehicle by causing the vibration or increasing the pedal effort in the acceleration pedal by using an actuator controlled by a controller, thereby inducing safe driving.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method for controlling an acceleration pedal of a vehicle that calls a driver's attention by causing vibration or increasing pedal effort in the acceleration pedal according to diversified driving situations.

Various aspects of the present invention provide for a method for controlling an acceleration pedal of a vehicle, which comprises selecting a control mode of selecting a control mode given to the acceleration pedal by a driver, judging an eco red state of judging whether the vehicle is driven for a predetermined time in the eco red state (in a case in which the vehicle is driven in low fuel efficiency), and executing the control mode of giving the control mode selected at the selecting of the control mode to the acceleration pedal when it is judged that the vehicle is driven for the predetermined time in the eco red state at the judging of the eco red state.

The control mode may include a vibration mode to give vibration to the acceleration pedal and a pedal effort mode to increase pedal effort on the acceleration pedal.

The method may further include firstly stopping execution of the control mode of, when the operational position of the acceleration pedal is increased by judging the operational position of the acceleration pedal after the executing of the control mode, stopping the executing of the control mode.

The method may further include secondly stopping execution of the control mode of, when a predetermined time elapses by checking an execution time of the control mode after the executing of the control mode, stopping the executing of the control mode.

The executing of the control mode may be executed via an actuator with an actuating rod that contacts the acceleration pedal and presses the acceleration pedal to increase the pedal effort or repetitively hits the acceleration pedal to give the vibration.

The executing of the control mode may be executed by verifying the position of the actuating rod, sensing the operational position of the acceleration pedal, calculating a control current value depending on the operational position of the acceleration pedal, and applying a control signal corresponding to the control current value to the actuator.

The actuator may be controlled to allow the actuating rod to be at all times positioned at an initial position after the executing of the control mode.

Other aspects of the present invention provide for a method for controlling an acceleration pedal of a vehicle, which comprises judging an inter-vehicle distance of sensing and judging the inter-vehicle distance while the vehicle is driven, judging a lane deviation of sensing and judging lane deviation while the vehicle is driven, judging an eco red state of judging whether the vehicle is driven in the eco red state, and executing a control mode of executing the control mode including a vibration mode to give vibration to the acceleration pedal or a pedal effort mode to increase pedal effort when it is judged that the inter-vehicle distance is within a predetermined distance in the judging of the inter-vehicle distance, it is judged that the vehicle deviates from the lane in the judging of the lane deviation, or it is judged that the vehicle is driven in the eco red state.

When the inter-vehicle distance is within a first reference distance in the judging of the inter-vehicle distance, the pedal effort mode may be executed in the executing of the control mode.

When the inter-vehicle distance is within a second reference distance in the judging of the inter-vehicle distance, the vibration mode may be executed in the executing of the control mode.

When the vehicle deviates from a central lane in the judging of the lane deviation, the vibration mode is executed in the executing of the control mode and when the vehicle deviates from a white lane for several seconds, the pedal effort mode may be executed in the executing of the control mode.

When the vehicle is driven in the eco red state in the judging of the eco red state, the pedal effort mode may be executed in the executing of the control mode.

The method may further include firstly stopping execution of the control mode of, when the operational position of the acceleration pedal is increased by judging whether the operational position of the acceleration pedal is increased after the executing of the control mode, stopping the executing of the control mode.

The method may further include secondly stopping execution of the control mode of, when a predetermined time elapses by checking an execution time of the control mode after the executing of the control mode, stopping the executing of the control mode.

Yet other aspects of the present invention provide for a method for controlling an acceleration pedal of a vehicle, which comprises judging a driving state of judging whether a driver dozes off while driving or is drunk while driving for a predetermined time, and executing a vibration mode of executing the vibration mode to give vibration to the acceleration pedal when the driver dozes off while driving or is drunken while driving in the judging of the driving state.

The method may further include judging whether a driving state is continued of judging whether the driver continues to doze off while driving or be drunk while driving after the executing of the vibration mode, stopping execution of the vibration mode of stopping the executing of the vibration mode when the driver does not continue to doze off while driving or be drunken while driving in the judging of whether the driving state is continued, judging whether a brake pedal is operated of judging whether the brake pedal is operated when it is judged that the driver continues to doze off while driving or be drunken while driving in the judging of whether the driving state is continued, and judging an operational amount of the acceleration pedal of judging whether the operational amount of the acceleration pedal is decreased when it is judged that the brake pedal is not operated in the judging of whether the brake pedal is operated, wherein the stopping of the execution of the vibration mode is executed when it is judged that the brake pedal is operated in the judging of whether the brake pedal is operated or it is judged that the operational amount of the acceleration pedal is decreased in the judging of the operational amount of the acceleration pedal.

Still other aspects of the present invention provide for a method for controlling an acceleration pedal of a vehicle, which comprises judging backward movement of judging whether a vehicle moves backwards, firstly judging a distance from a collision object of judging the distance between the rear of the vehicle moving backward and the collision object, and executing a control mode of executing a vibration mode to give vibration to the acceleration pedal and a pedal effort mode to increase pedal effort according to the distance judged in the judging of the distance from the collision object.

When the distance judged in the judging of the distance from the collision object is within a predetermine distance, the vibration mode may be executed in the control mode and when the judged distance is the predetermined distance or more, the pedal effort mode may be executed.

The method may further include judging whether backward movement is continued of judging whether the vehicle continues to move backward after the pedal effort mode is executed in the control mode, judging whether a brake pedal is operated of judging whether the brake pedal is operated when the vehicle continues to move backward in the judging of whether backward movement is continued, and secondly judging a distance from a collision object of judging the distance from the collision object when it is judged that the brake pedal is not operated in the judging of whether the brake pedal is operated, wherein the vibration mode is executed when the distance is within a predetermined distance in the secondly judging of the distance from the collision object, while the process returns to the judging of whether backward movement is continued when the distance is the predetermined distance or more.

Still other aspects of the present invention provide for a method for controlling an acceleration pedal of a vehicle, which comprises judging a warning lamp of judging whether a fuel warning lamp or a battery warning lamp of the vehicle is lighted, calculating a drivable distance of calculating the drivable distance when it is judged that the warning lamp is lighted in the judging of the warning lamp, and executing a control mode of executing the control mode including a vibration mode to give vibration to the acceleration pedal or a tick mode to give a tick to the acceleration pedal according to the drivable distance calculated in the calculating of the drivable distance.

When the drivable distance calculated in the calculating of the drivable distance is within a predetermined distance, the vibration mode may be executed in the executing of the control mode and when the calculated drivable distance is the predetermined distance or more, the tick mode may be executed in the executing of the control mode.

Still yet other aspects of the present invention provide for a method for controlling an acceleration pedal of a vehicle, which comprises judging simultaneous actuation of judging whether both a brake pedal and the acceleration pedal of the vehicle are actuated for a predetermined time, and executing a control mode of executing a tick mode to give a tick to the acceleration pedal when it is judged that both the brake pedal and the acceleration pedal are actuated in the judging of the simultaneous actuation.

Still yet other aspects of the present invention provide for a method for controlling an acceleration pedal of a vehicle, which comprises judging deviation from a guide road of judging whether the vehicle deviates from the road guided by a navigation system while being driven, and executing a control mode of executing a tick mode to give a tick to the acceleration pedal when it is judged that the vehicle deviates from the guide road in the judging of the deviation from the guide road.

According to other aspects of the present invention, a method for controlling an acceleration pedal of a vehicle calls a driver's attention by causing vibration (a vibration mode) or increasing pedal effort (a pedal effort mode) according to driver's selection in the acceleration pedal when the driver drives the vehicle with fuel efficiency deteriorated by excessively operating an acceleration pedal while traveling to thereby induce the driver to perform economic driving with improved fuel efficiency.

Further, in the case in which the vehicle is close to a car ahead to be in a risk of a crash accident or deviates from a traffic lane while travelling, a vibration mode or a pedal effort mode to the acceleration pedal is given to call the driver's attention, such that a traffic accident can be prevented.

In addition, the method warns the driver against a dangerous situation by giving the vibration mode to the acceleration pedal in the case in which the driver dozes off while driving or drives under the influence of alcohol to thereby prevent the traffic accident.

Further, since the method calls the driver's attention by giving the vibration mode or the pedal effort mode to the acceleration pedal according to the proximity between a rear object and the vehicle when the vehicle moves backward, the method provides backward driving convenience to the driver.

In the case in which a fuel warning lamp of the vehicle is lighted, the driver is warned against a fuel shortage state by giving the vibration mode to the acceleration pedal or leaping the acceleration pedal (a tick mode) according to a drivable distance, thereby providing driving convenience to the driver.

In the case in which various aspects of the present invention are applied to an electric vehicle, when there is a risk that a battery will be discharged or the battery is required to be charged in the electric vehicle, the tick mode or vibration mode is given to the acceleration pedal to call the driver's attention, thereby providing driving convenience to the driver.

When the driver operates both a brake pedal and the acceleration pedal due to inexperienced driving, the tick mode is given to the acceleration pedal to call the driver's attention, thereby inducing the driver to perform safe driving.

Further, in the case in which the driver drives the vehicle while being guided by a navigation system mounted on the vehicle, when the driver deviates from a road guided by the navigation system, the tick mode is given to the acceleration pedal to warn the driver against positional deviation of the vehicle, thereby providing driving convenience.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a flowchart of an exemplary method for controlling an acceleration pedal according to the present invention.

FIG. 8 is a flowchart of an exemplary method for controlling an acceleration pedal according to the present invention.

FIG. 9 is a flowchart of an exemplary method for controlling an acceleration pedal according to the present invention.

Figure 1:
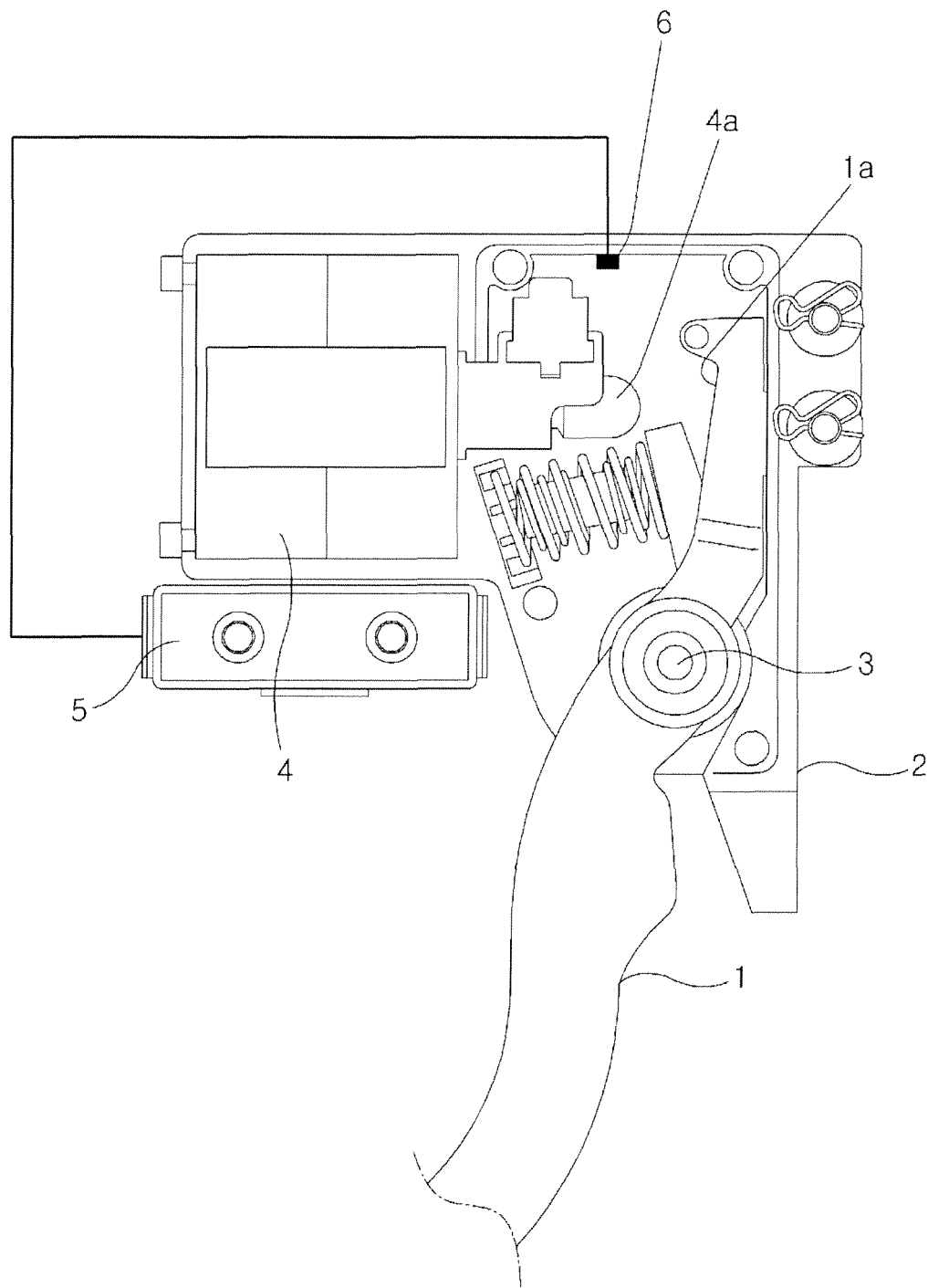
FIG. 1 is a configuration diagram of an acceleration pedal device employing an exemplary control method according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In FIG. 1, an acceleration pedal device of a vehicle employing a control method according to various embodiments of the present invention is shown, that is, an acceleration pedal 1 is rotatably installed in a housing 2 through a hinge shaft 3 and an actuator 4 is fixedly installed in housing 2 to be adjacent to a front end portion 1a of acceleration pedal 1.

When actuator 4 is provided with an actuating rod 4a protruding toward front end portion 1a of acceleration pedal 1 and actuating rod 4a contacts front end portion 1a to pressurize acceleration pedal 1, operating pedal effort of the acceleration pedal is increased. That is, a pedal effort mode is given to the acceleration pedal by the actuator.

In addition, when actuating rod 4a repetitively hits front end portion 1a, vibration is given to acceleration pedal 1 and a vibration mode is given to acceleration pedal 1 by actuator 4.

Further, when actuating rod 4a hits front end portion 1a only once for a short time, acceleration pedal 1 leaps, and as a result, a tick mode is given to acceleration pedal 1 by actuator 4.

A controller 5 is connected to actuator 4 in order to control actuator 4 and actuator 4 is actuated according to a control signal of controller 5 to give the vibration mode, the pedal effort mode, or the tick mode to the acceleration pedal.

Further, a position sensing sensor 6 sensing the position of actuating rod 4a is installed in housing 2 and position sensing sensor 6 is connected with controller 5 to input a sensing signal of the position sensing sensor in controller 5.

Meanwhile, although not shown, a selection switch that can allow a driver to select the vibration mode, the pedal effort mode, or the tick mode given to the acceleration pedal is provided in a driver's seat.

Figure 2:
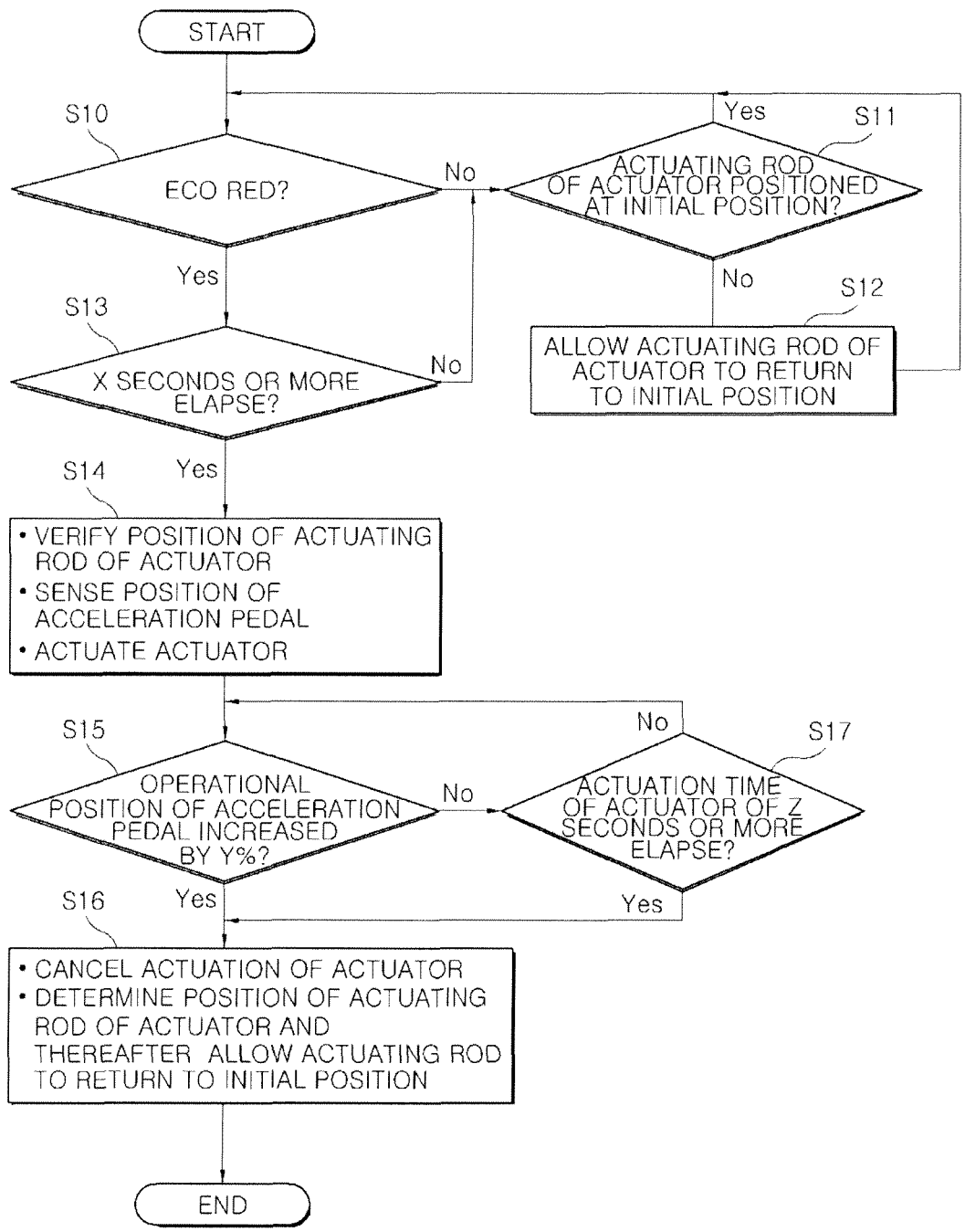
FIG. 2 is a flowchart of an exemplary method for controlling an acceleration pedal according to the present invention.

In FIG. 2, an exemplary control method of the acceleration pedal according to various embodiments of the present invention is shown. Therefore, an eco-mode display device installed in the vehicle is connected to controller 5 to receive an eco-mode signal through the eco-mode display device.

As described above, when controller 5 receives a signal from the eco-mode display device, controller 5 controls actuator 4 according to the following control flowchart.

Controller 5 receives the signal from the eco-mode display device to judge whether the signal is an eco red signal while driving the vehicle (S10).

The eco red signal represents a case in which the driver drives the vehicle in the state in which the vehicle is low in fuel efficiency by driving the vehicle while excessively stepping on the acceleration pedal.

If the eco red signal is not inputted, the controller verifies the position of actuating rod 4a of the actuator through position sensing sensor 6 (S11).

When actuating rod 4a of the actuator is positioned at an initial position, the process returns to a start step and when actuating rod 4a is not positioned at the initial position, the controller applies the control signal to the actuator to allow the actuating rod of the actuator to be positioned at the initial position (S12).

At step S10, when the eco red signal is inputted into the controller, the controller judges whether the eco red signal elapses for X seconds, e.g., 0.5 seconds or more (S13).

If X seconds does not elapse, the process returns to step S11 and if X seconds elapse, the controller judges whether the driver excessively operate the acceleration pedal to actuate the actuator.

That is, at step S14, the controller first verifies whether the actuating rod of the actuator is positioned at the initial position, senses the positioned of the acceleration pedal through an acceleration pedal sensor, and calculates a control signal suitable for any one control mode of control modes (the vibration mode, the pedal effort mode, and the tick mode) selected by the driver according to the position of the acceleration pedal and applies the calculated control signal to the actuator to actuate the actuator.

As a result, the control mode selected by the driver is provided to the acceleration pedal to vibrate the acceleration pedal or increase operational pedal effort of the acceleration pedal, thereby calling the driver's attention.

The controller may sense the position of the acceleration pedal through the acceleration pedal sensor, e.g., a CAN communication.

Subsequently, the controller judges whether an operational position of the acceleration pedal is increased by Y % (S15).

The reason to verify whether the operational position of the acceleration pedal is increased at step S15 is to judge the driver's acceleration will.

If the driver operates the acceleration pedal with the acceleration will (an operational amount of the acceleration pedal is increased by Y %), the controller cancels the control signal applied to the actuator and verifies the position of the actuating rod of the actuator, and thereafter, allows the actuating rod of the actuator to return to the initial position, at next step S16.

If the operational amount of the acceleration pedal is not increased by Y % at step S15, it is judged that the driver operates the acceleration pedal without the acceleration will and it is judged whether Z seconds, e.g., 0.5 seconds elapse as an actuation time of the actuator at next step S17.

This is to actuate the actuator only for 0.5 seconds.

If Z seconds elapse, the process proceeds to step S16 to cancel the actuation of the actuator and if Z seconds do not elapse, the actuation of the actuator is continued for Z seconds.

Figure 3:
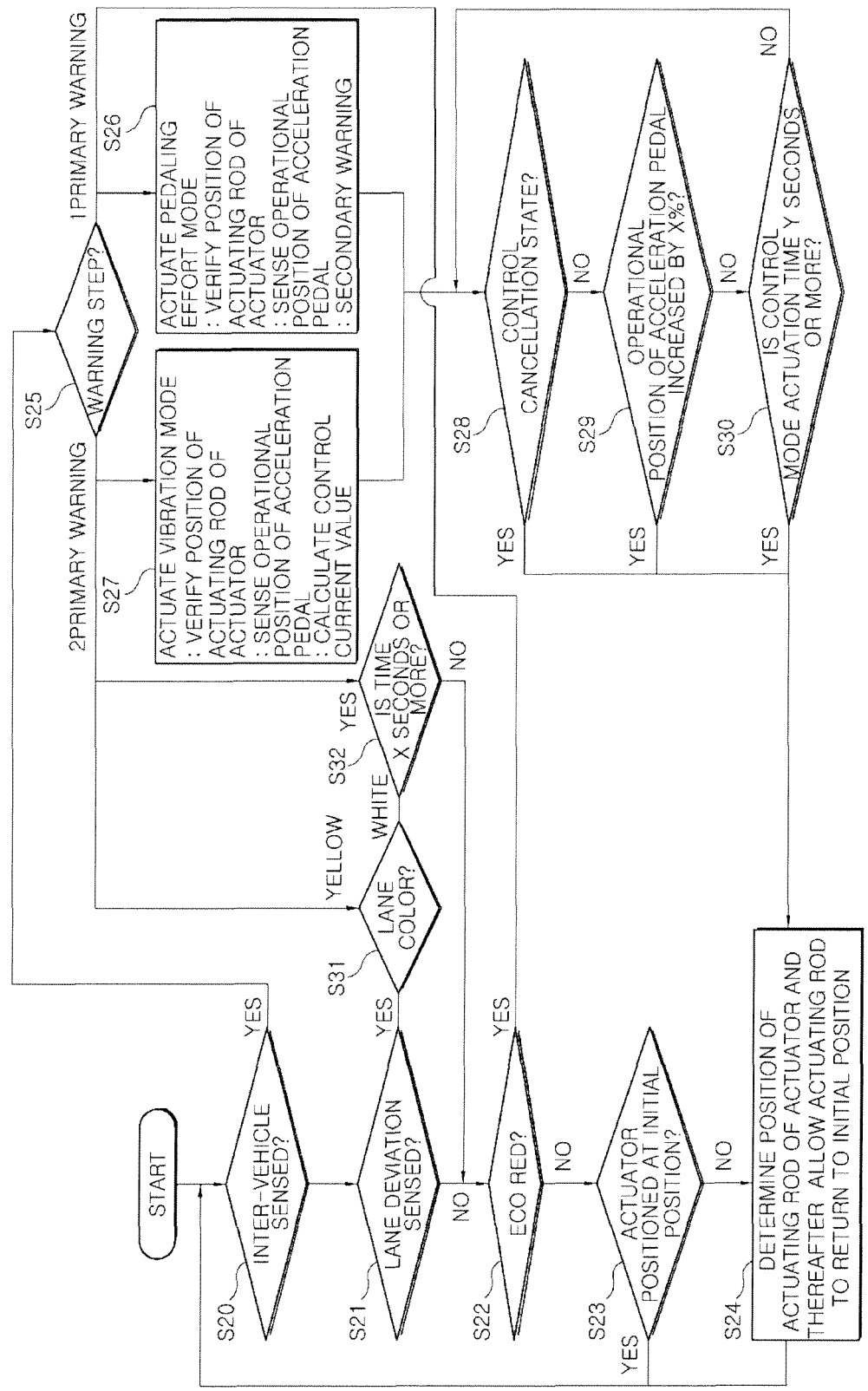
FIG. 3 is a flowchart of an exemplary method for controlling an acceleration pedal according to the present invention.

In FIG. 3, an exemplary control method of the acceleration pedal according to various embodiments of the present invention is shown. Therefore, an inter-vehicle distance sensing sensor sensing an inter-vehicle distance, a lane deviation sensing sensor sensing lane deviation, and an eco-mode display device are connected to controller 5 to receive signals through the sensors and the eco-mode display device.

First, controller 5 judges whether the inter-vehicle distance is sensed from the inter-vehicle distance sensing sensor (S20).

If the inter-vehicle distance is not sensed at step S20, it is judged whether lane deviation is sensed from the lane deviation sensing sensor at next step S21. If lane deviation is not sensed at step S21, it is judged whether the signal inputted from the eco-mode display device is the eco red signal at next step S22. If the eco red signal is not inputted at step S22, the controller verifies the position of the actuating rod of the actuator through the position sensing sensor and if the actuating rod of the actuator is not positioned at the initial position, the controller applies the control signal to the actuator to allow the actuating rod of the actuator to return to the initial position at next step S24.

If the inter-vehicle distance is sensed at step S20, a warning step or not is judged at next step S25. That is, if the inter-vehicle distance is close to a first reference distance a1, it is judged as a primary warning state and if the inter-vehicle distance is close to a second reference distance a2 smaller than first reference distance a1, it is judged as a secondary warning state.

If it is the primary warning state at step S25, the controller applies the control signal to the actuator to execute the pedal effort mode that increases the pedal effort to the acceleration pedal at step S26. That is, the controller verifies the position of the actuating rod of the actuator through the position sensing sensor and senses the position of the acceleration pedal from the acceleration pedal sensor, and calculates a control current value depending on the position of the acceleration pedal to apply the calculated control current value to the actuator as the control signal.

As a result, a dangerous situation in which the inter-vehicle distance is close is primarily warned to the driver who operates the acceleration pedal through the pedal effort increased in the acceleration pedal.

Meanwhile, if the inter-vehicle distance is very close to be smaller than second reference distance a2, the controller executes the vibration mode to give the vibration to the acceleration pedal, thereby giving a secondary warning to the driver, at step S27.

Even in this case, the controller verifies the position of the actuating rod of the actuator through the position sensing sensor and senses the position of the acceleration pedal from the acceleration pedal sensor, and calculates a control current value depending on the position of the acceleration pedal to apply the calculated control current value to the actuator as the control signal.

After steps S26 and S27 are executed, a control cancellation state or not is judged at step S28. The control cancellation state represents a case in which the inter-vehicle distance is far from the first or second reference distance and a case in which the vehicle does not deviate from the lane.

If it is not the control cancellation state at step S28, it is judged whether the operational position of the acceleration pedal is increased by X % at step S29. The state in which the operational position of the acceleration pedal is increased by X % is used to judge whether the driver operates the acceleration pedal with his/her will to accelerate the vehicle.

If the operational position of the acceleration pedal is not increased by X % at step S29, it is judged whether a control mode actuation time of Y seconds or more elapses at next step S30. If Y seconds or more do not elapse, the process returns to step S28.

When it is judged as the control cancellation state at step S28, the operational position of the acceleration pedal is increased by X % or more and thus it is judged that the acceleration pedal is operated at step S29, or it is judged that the control mode actuation time of Y seconds or more elapses at step S30, each of the steps returns to step S24.

Meanwhile, if it is judged that the lane deviation is sensed at step S21, deviating from a yellow lane (a central lane) or deviating from a white lane is judged at step S21 and if deviating from the yellow lane is judged, the process proceeds to step S27 and the controller executes the vibration mode to warn the driver through the vibration of the acceleration pedal and if deviating from the white lane is judged, it is judged whether a predetermined time, e.g., 2.7 seconds or more elapses at next step S32 and if it is judged that 2.7 seconds or more elapse, the process proceeds to step S27 and the controller executes the vibration mode to warn the driver through the vibration of the acceleration pedal, while if 2.7 seconds do not elapse, the process proceeds to step S22.

That is, when the driver temporarily deviates from the lane of the vehicle in order to change the lane, a warning is not given to the driver.

When it is judged that the eco red signal is inputted at step S22, the process proceeds to step S26 and the controller executes the pedal effort mode to increase the pedal effort of the acceleration pedal to thereby warn the driver against excessively operating the acceleration pedal through the increased pedal effort of the acceleration pedal.

Meanwhile, since an error signal inputted into the controller takes priority to all control signals, that is, in the case in which a sensing signal of the acceleration pedal sensor is erroneous, the position of the actuating rod of the actuator is determined through the position sensing sensor of actuating rod 4a to allow the actuating rod to return to the initial position and in the case in which an input signal of the position sensing sensor of actuating rod 4a is erroneous, the controller returns the actuating rod to the initial position by controlling the current of the actuator and thereafter, lights an error lamp to warn the driver.

Figure 4:
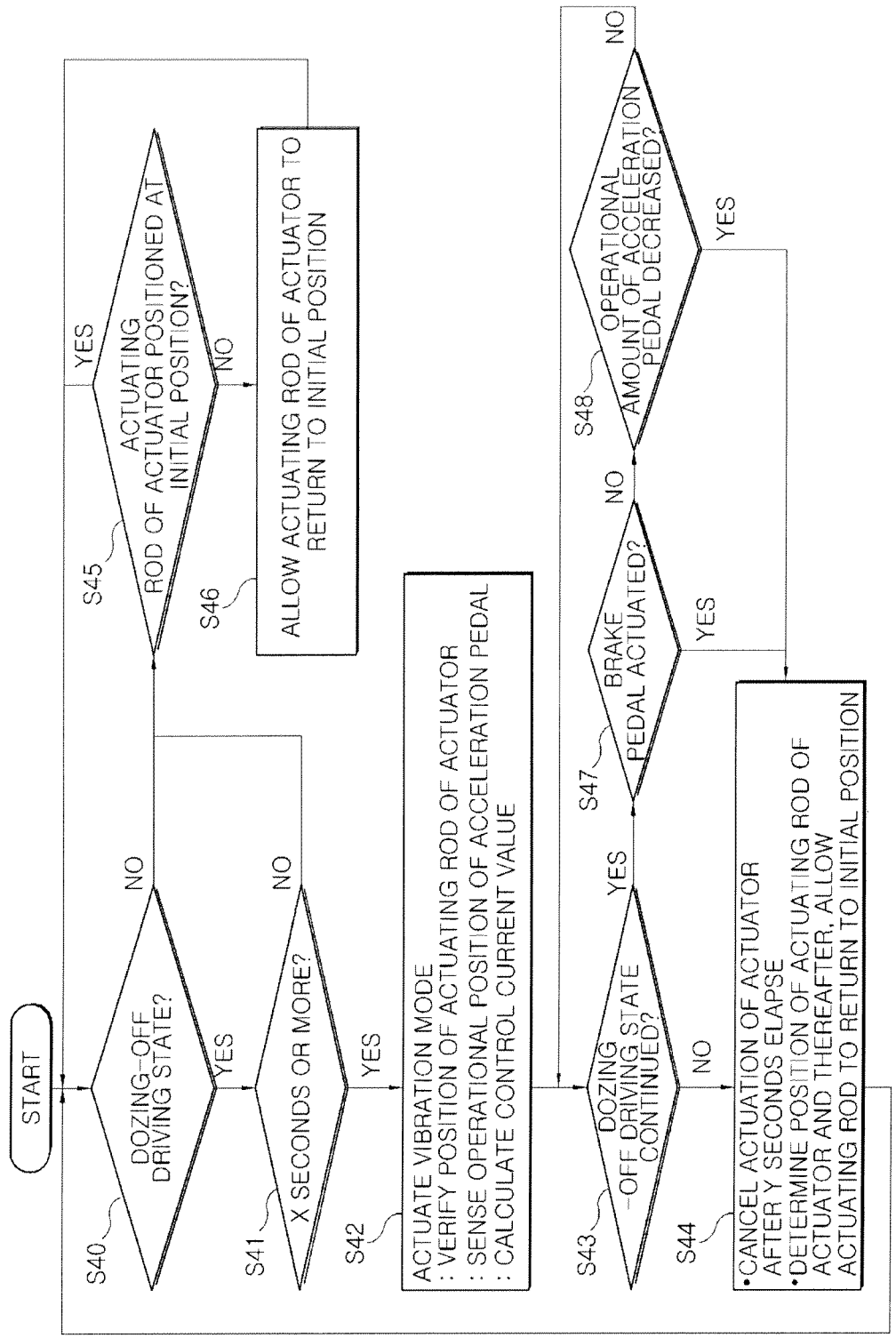
FIG. 4 is a flowchart of an exemplary method for controlling an acceleration pedal according to the present invention.

In FIG. 4, a flowchart of an exemplary control method of an acceleration pedal according to the present invention is shown. Therefore, a dozing-off driving sensing sensor sensing dozing-off driving of the driver and a drunk driving sensing sensor sensing drunk driving of the driver are each connected to controller 5.

The dozing-off driving sensing sensor and the drunk driving sensing sensor may be constituted by a known infrared lamp and a known camera.

First, the controller judges a dozing-off driving state or not (S40). In the case of the dozing-off driving state, it is judged whether the dozing-off state is for X seconds or more at next step S41. If it is judged that dozing-off driving is continued for X seconds or more, the controller executes the vibration mode to warn the driver through the vibration of the acceleration pedal at next step S42.

In this case, the controller verifies the position of the actuating rod of the actuator through the position sensing sensor of actuating rod 4a and senses the position of the acceleration pedal from the acceleration pedal sensor, and calculates a control current value depending on the position of the acceleration pedal to apply the calculated control current value to the actuator as the control signal.

Subsequently, the controller judges whether the dozing-off driving of the driver is continued at step S43 and if the dozing-off driving is not continued, actuation of the actuator continued for Y seconds is cancelled and the position of the actuating rod of the actuator is determined and thereafter, if the actuating rod is not positioned at the initial position, the actuating rod returns to the initial position, at next step S44.

If not the dozing-off driving state at step S40, the position of the actuating rod of the actuator is judged by the position sensing sensor at step S45 and if the actuating rod is not positioned at the initial position, an actuation signal is applied to the actuator to allow the actuating rod to return to the initial position (S46).

If it is judged that the dozing-off driving is continued at step S43, it is judged whether a brake pedal is actuated at step S47 and if the brake pedal is actuated, the process proceeds to step S44, while if the brake pedal is not actuated, it is judged whether the operational amount of the acceleration pedal is decreased through the acceleration pedal sensor at step S48 and if the operational amount of the acceleration pedal is not decreased, the process proceeds to step S43, while if the operational amount of the acceleration pedal is decreased, the process proceeds to step S44.

Meanwhile, even in the case in which the driver is in the drunken driving, the driver who is in the drunk driving is warned by the same method.

Therefore, in the case in which the driver dozes off while driving or is in the drunken driving, the vibration is given to the acceleration pedal to call the driver's attention, thereby preventing a traffic accident.

Figure 5:
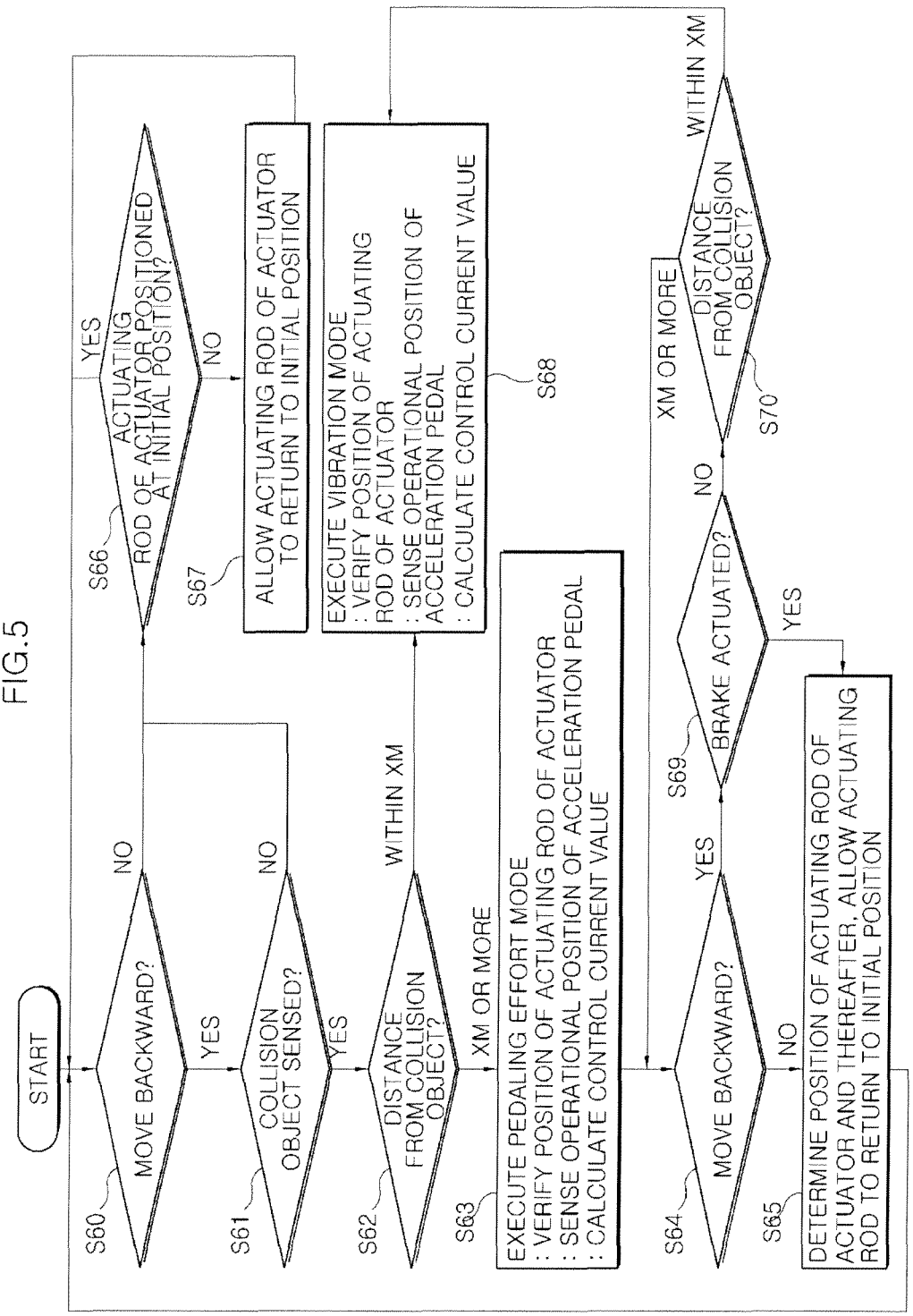
FIG. 5 is a flowchart of an exemplary method for controlling an acceleration pedal according to the present invention.

In FIG. 5, a flowchart of an exemplary control method of an acceleration pedal according to the present invention is shown. Therefore, in various embodiments, a rear object is sensed while the vehicle moves backward and the pedal effort mode or vibration mode is executed to warn the driver, thereby providing driving convenience.

A shift lever sensing sensor sensing an operational position of a shift lever, a rear sensing sensor sensing the rear object and sensing a distance from the rear object, and a brake pedal operation sensing sensor are connected to controller 5.

First, controller 5 judges whether the vehicle moves backward through the shift lever sensing sensor (S60).

If it is judged that the vehicle moves backward, it is judged whether a collision object is present in the rear through the rear sensing sensor at next step S61 and if it is judged that the collision object is present in the rear, a distance between the vehicle and the rear collision object is judged through the rear sensing sensor at step S62 and if the distance between the rear collision object and the vehicle is Xm or more, the controller executes the pedal effort mode to warn the driver through the increased pedal effort of the acceleration pedal at next step S63.

In this case, the controller verifies the position of the actuating rod of the actuator through the position sensing sensor of actuating rod 4a and senses the position of the acceleration pedal from the acceleration pedal sensor, and calculates a control current value depending on the position of the acceleration pedal to apply the calculated control current value to the actuator as the control signal.

It is judged whether the vehicle moves backward at next step S64 after the pedal effort mode is executed and when it is judged that the vehicle does not move backward, the position of the actuating rod of the actuator is determined through the position sensing sensor to allow the actuating rod to return to the initial position at next step S65.

If the vehicle does not move backward at step S60, the process proceeds to next step S66 and it is judged whether the actuating rod of the actuator is positioned at the initial position and if the actuating rod is not positioned at the initial position, the actuation signal is applied to the actuator to allow the actuating rod to return to the initial position at next step S67.

If the collision object is not sensed in the rear at step S61, the process proceeds to step S66 and if the collision object is present within Xm at step S62, the controller executes the vibration mode and gives vibration to the acceleration pedal to warn the driver at next step S68.

In this case, the controller verifies the position of the actuating rod of the actuator through the position sensing sensor of actuating rod 4a and senses the position of the acceleration pedal from the acceleration pedal sensor, and calculates a control current value depending on the position of the acceleration pedal to apply the calculated control current value to the actuator as the control signal.

When the vehicle moves backward at step S64, the controller judges whether the brake is actuated through the brake pedal operation sensing sensor at step 69 and when the brake is actuated, the process proceeds to step S65, while when the brake is not actuated, the distance between the vehicle and the rear collision object is sensed at step S70 and if the sensed distance is Xm or more, step S64 is continued, while if the sensed distance is within Xm, the process proceeds to step S68 and the vibration mode is executed to warn the driver.

Figure 6:
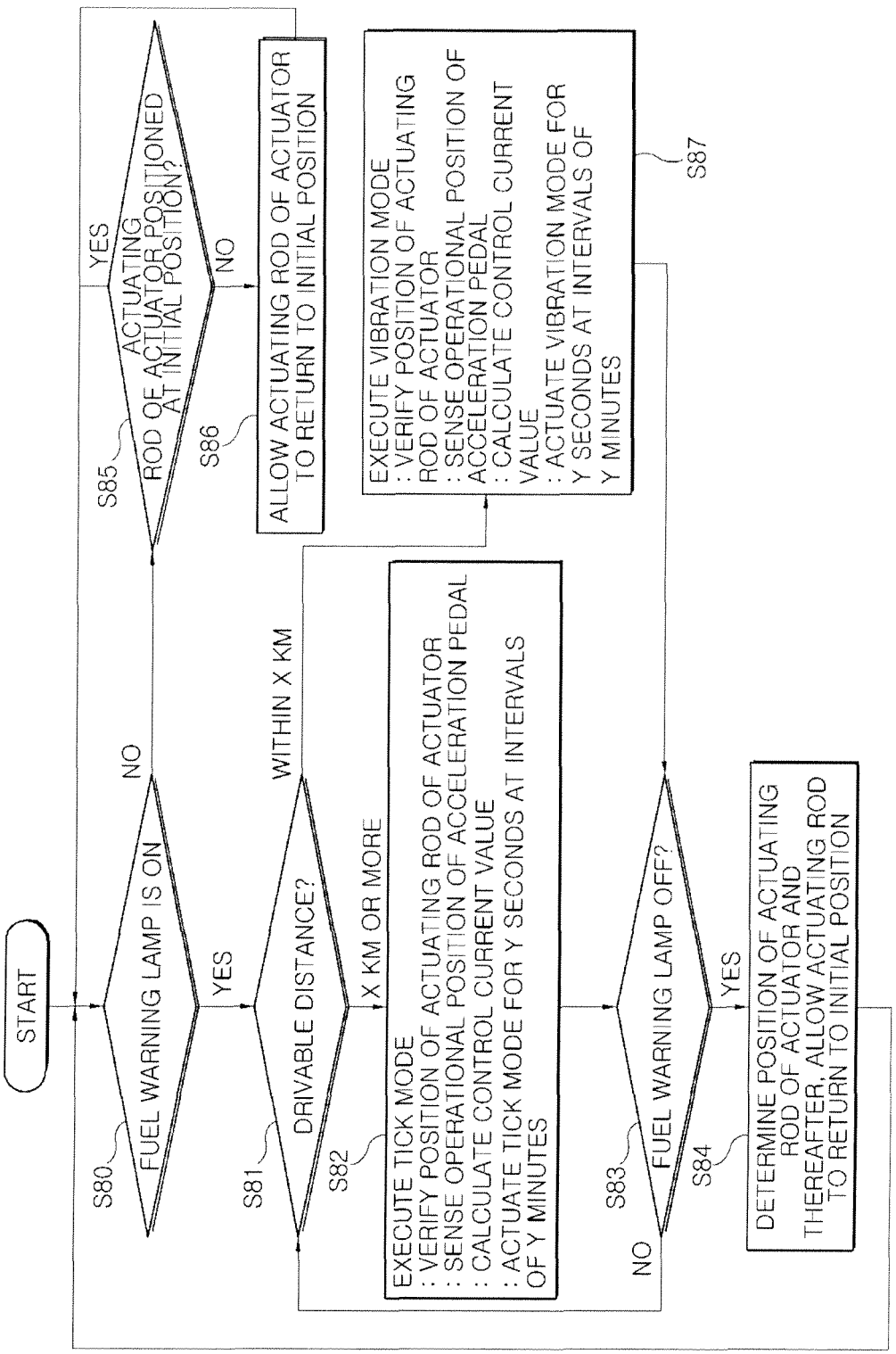
FIG. 6 is a flowchart of an exemplary method for controlling an acceleration pedal according to the present invention.

In FIG. 6, a flowchart of an exemplary control method of an acceleration pedal according to the present invention is shown. Therefore, in various embodiments, when fuel is short while the vehicle is driven, the tick mode or the vibration mode is given to the acceleration pedal to warn the driver through the acceleration pedal, thereby providing driving convenience.

A fuel warning lamp and a drivable distance calculating device are each connected to controller 5.

Controller 5 judges whether an on signal is inputted into the fuel warning lamp (S80). If the fuel warning lamp is turned on, a drivable distance is judged through the drivable distance calculating device at next step S81 and if the drivable distance is Xm or more, controller 5 executes the tick mode to warn the driver through the acceleration pedal at step S82.

In this case, the controller verifies the position of the actuating rod of the actuator through the position sensing sensor of actuating rod 4a and senses the position of the acceleration pedal from the acceleration pedal sensor, and calculates a control current value depending on the position of the acceleration pedal to apply the calculated control current value to the actuator as the control signal.

The control signal is executed for Y seconds at intervals of Y minutes.

Subsequently, it is judged whether the fuel warning lamp is turned off at next step S83 and if the fuel warning lamp is not turned off, the process proceeds to step S81 and a control is continued, while if the fuel warning lamp is turned off, it represents the state where fuel is injected into the vehicle. Therefore, the position of the actuating rod of the actuator is determined and thereafter, the actuating rod returns to the initial position at next step S84.

If the fuel warning lamp is turned off at step S80, it is judged whether the actuator is positioned at the initial position at next step S85 and if the actuator is not positioned at the initial position, the actuating rod returns to the initial position at next step S86.

When it is judged that the drivable distance is within Xm at step S81, the controller executes the vibration mode to warn the driver through the acceleration pedal and thereafter, the process proceeds to step S83.

In this case, the controller verifies the position of the actuating rod of the actuator through the position sensing sensor of actuating rod 4a and senses the position of the acceleration pedal from the acceleration pedal sensor, and calculates a control current value depending on the position of the acceleration pedal to apply the calculated control current value to the actuator as the control signal.

The control signal is executed for Y seconds at intervals of Y minutes.

In FIG. 7, a flowchart of an exemplary control method of an acceleration pedal according to the present invention is shown. Therefore, in various embodiments, when the charging capacity of the battery is short while the electric vehicle is driven, the tick mode or the vibration mode is given to the acceleration pedal to warn the driver through the acceleration pedal, thereby providing driving convenience.

A battery warning lamp and the drivable distance calculating device are each connected to controller 5.

Controller 5 judges whether the on signal is inputted into the battery warning lamp (S100). If the battery warning lamp is turned on, the drivable distance is judged through the drivable distance calculating device at next step S101 and if the drivable distance is Xm or more, controller 5 executes the tick mode to warn the driver through the acceleration pedal at step S102.

In this case, the controller verifies the position of the actuating rod of the actuator through the position sensing sensor of actuating rod 4a and senses the position of the acceleration pedal from the acceleration pedal sensor, and calculates a control current value depending on the position of the acceleration pedal to apply the calculated control current value to the actuator as the control signal.

The control signal is executed for Y seconds at intervals of Y minutes.

Subsequently, it is judged whether the battery warning lamp is turned off at next step S103 and if the battery warning lamp is not turned off, the process proceeds to step S101 and the control is continued, while if the battery warning lamp is turned off, it represents the state where the battery of the electric vehicle is charged. Therefore, the position of the actuating rod of the actuator is determined and thereafter, the actuating rod returns to the initial position, at next step S104.

If the battery warning lamp is turned off at step S100, it is judged whether the actuator is positioned at the initial position at next step S105 and if the actuator is not positioned at the initial position, the actuating rod returns to the initial position at next step S106.

When it is judged that the drivable distance is within Xm at step S101, the controller executes the vibration mode to warn the driver through the acceleration pedal and thereafter, the process proceeds to step S103.

In this case, the controller verifies the position of the actuating rod of the actuator through the position sensing sensor of actuating rod 4a and senses the position of the acceleration pedal from the acceleration pedal sensor, and calculates a control current value depending on the position of the acceleration pedal to apply the calculated control current value to the actuator as the control signal.

The control signal is executed for Y seconds at intervals of Y minutes.

In FIG. 8, a flowchart of an exemplary control method of an acceleration pedal according to the present invention is shown. Therefore, in various embodiments, when the driver operates both a brake pedal and the acceleration pedal due to careless driving, the tick mode is given to the acceleration pedal to warn the driver, thereby providing driving operation convenience and improving the stability of the vehicle.

An acceleration pedal operation sensing sensor and the brake pedal operation sensing sensor are each connected to controller 5.

Controller 5 judges whether both the brake pedal and the acceleration pedal are operated (S120).

If both the brake pedal and the acceleration pedal are operated at the step, it is judged whether a simultaneous operation time is continued for X seconds at next step S121. If both the brake pedal and the acceleration pedal are operated for X seconds, the controller executes the tick mode to warn the driver through the acceleration pedal at next step S122.

In this case, the controller verifies the position of the actuating rod of the actuator through the position sensing sensor of actuating rod 4a and senses the position of the acceleration pedal from the acceleration pedal sensor, and calculates a control current value depending on the position of the acceleration pedal to apply the calculated control current value to the actuator as the control signal.

Subsequently, the controller judges whether both the brake pedal and the acceleration pedal are again operated at next step S123 and if both the brake pedal and the acceleration pedal are not operated, the controller determines the position of the actuating rod through the position sensing sensor of the actuating rod of the actuator and thereafter, allows the actuating rod to return to the initial position, at next step S124.

When it is judged that both the brake pedal and the acceleration pedal are not operated at step S120, the controller judges whether the actuating rod is positioned at the initial position at step S125 and if the actuating rod is not positioned at the initial position, the controller controls the actuator to allow the actuating rod to be positioned at the initial position at next step S126.

In FIG. 9, a flowchart of an exemplary control method of an acceleration pedal according to the present invention is shown. Therefore, in various embodiments, in the case in which the vehicle is driven by deviating from the road guided by the navigation system in association with a signal of the navigation system installed in the vehicle, the tick mode is given to the acceleration pedal to warn the driver, thereby providing driving operation convenience.

A navigation device is connected to controller 5.

The controller judges whether the vehicle deviates from the road guided by the navigation system through the navigation device while the vehicle is driven (S140).

If the vehicle deviates from the road, the controller executes the tick mode at one time to warn the driver through the acceleration pedal at step S141.

In this case, the controller verifies the position of the actuating rod of the actuator through the position sensing sensor of actuating rod 4a and senses the position of the acceleration pedal from the acceleration pedal sensor, and calculates a control current value depending on the position of the acceleration pedal to apply the calculated control current value to the actuator as the control signal.

When it is judged that the vehicle does not deviate from the road guided by the navigation device at step 5144, the controller judges whether the actuating rod of the actuator is positioned at the initial position at step S142 and if the actuating rod is not positioned at the initial position, the controller applies the control signal to the actuator to allow the actuating rod of the actuator to return to the initial position.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an acceleration pedal of a vehicle, the method comprising:
    selecting a control mode of selecting a control mode given to the acceleration pedal through a driver;
    judging an eco red state of judging whether the vehicle is driven for a predetermined time in the eco red state; and
    executing the control mode of giving the control mode selected at the selecting of the control mode to the acceleration pedal when it is judged that the vehicle is driven for the predetermined time in the eco red state at the judging of the eco red state,
    wherein the control mode includes a vibration mode to vibrate the acceleration pedal and a pedal effort mode to increase pedal effort on the acceleration pedal.

2. The method as defined in claim 1, further comprising: firstly stopping execution of the control mode of, when the operational position of the acceleration pedal is increased by judging the operational position of the acceleration pedal after the executing of the control mode, stopping the executing of the control mode.

3. The method as defined in claim 1, further comprising: secondly stopping execution of the control mode of, when a predetermined time elapses by checking an execution time of the control mode after the executing of the control mode, stopping the executing of the control mode.

4. The method as defined in claim 1, wherein the executing of the control mode is executed through an actuator with an actuating rod that contacts the acceleration pedal and presses the acceleration pedal to increase the pedal effort or repetitively hits the acceleration pedal to vibrate.

5. The method as defined in claim 4, wherein the executing of the control mode is executed by verifying the position of the actuating rod, sensing the operational position of the acceleration pedal, calculating a control current value depending on the operational position of the acceleration pedal, and applying a control signal corresponding to the control current value to the actuator.

6. The method as defined in claim 4, wherein the actuator is controlled to allow the actuating rod to be at all times positioned at an initial position after the executing of the control mode.

7. A method for controlling an acceleration pedal of a vehicle, the method comprising:
    judging an inter-vehicle distance of sensing and judging the inter-vehicle distance while the vehicle is driven;
    judging a lane deviation of sensing and judging lane deviation while the vehicle is driven;
    judging an eco red state of judging whether the vehicle is driven in the eco red state; and
    executing a control mode of executing the control mode including a vibration mode to vibrate the acceleration pedal or a pedal effort mode to increase pedal effort when it is judged that the inter-vehicle distance is within a predetermined distance in the judging of the inter-vehicle distance, it is judged that the vehicle deviates from the lane in the judging of the lane deviation, or it is judged that the vehicle is driven in the eco red state.

8. The method as defined in claim 7, wherein when the inter-vehicle distance is within a first reference distance in the judging of the inter-vehicle distance, the pedal effort mode is executed in the executing of the control mode.

9. The method as defined in claim 8, wherein when the inter-vehicle distance is within a second reference distance in the judging of the inter-vehicle distance, the vibration mode is executed in the executing of the control mode.

10. The method as defined in claim 8, further comprising: firstly stopping execution of the control mode of, when the operational position of the acceleration pedal is increased by judging whether the operational position of the acceleration pedal is increased after the executing of the control mode, stopping the executing of the control mode.

11. The method as defined in claim 8, further comprising: secondly stopping execution of the control mode of, when a predetermined time elapses by checking an execution time of the control mode after the executing of the control mode, stopping the executing of the control mode.

12. The method as defined in claim 7, wherein when the vehicle deviates from a central lane in the judging of the lane deviation, the vibration mode is executed in the executing of the control mode and when the vehicle deviates from a white lane for several seconds, the pedal effort mode is executed in the executing of the control mode.

13. The method as defined in claim 7, wherein when the vehicle is driven in the eco red state in the judging of the eco red state, the pedal effort mode is executed in the executing of the control mode.

14. The method as defined in claim 7, wherein the executing of the control mode is executed through an actuator with an actuating rod that contacts the acceleration pedal and presses the acceleration pedal to increase the pedal effort or repetitively hits the acceleration pedal to vibrate.

15. The method as defined in claim 14, wherein the executing of the control mode is executed by verifying the position of the actuating rod, sensing the operational position of the acceleration pedal, calculating a control current value depending on the operational position of the acceleration pedal, and applying a control signal corresponding to the control current value to the actuator.

16. The method as defined in claim 15, wherein the actuator is controlled to allow the actuating rod to be at all times positioned at an initial position after the executing of the control mode.

* * * * *